March 26, 1957 R. DETHMERS ET AL 2,786,358
STARTING UNIT FOR FARM MACHINE MOTORS
Filed July 24, 1953
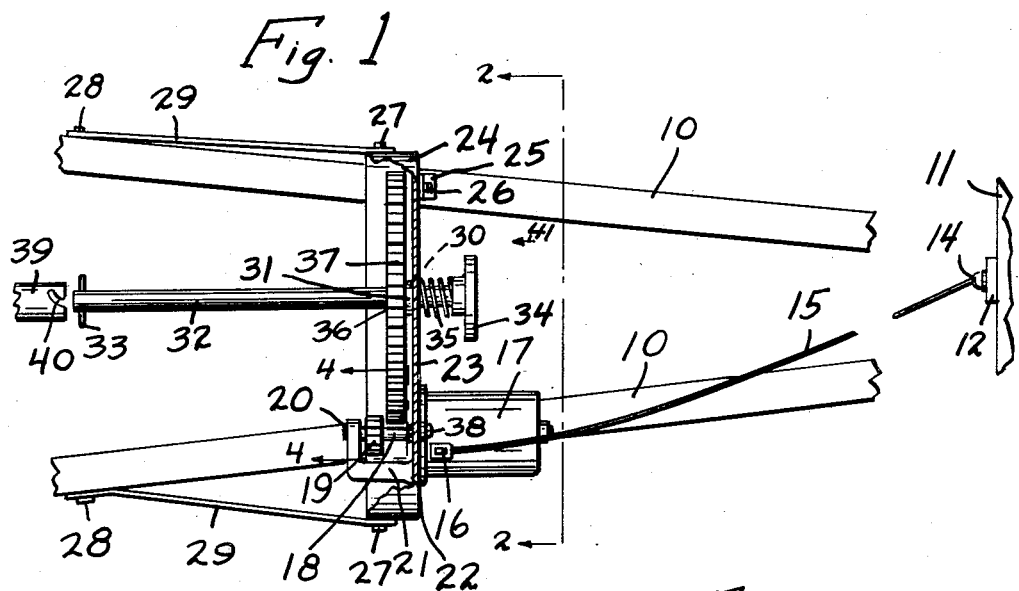
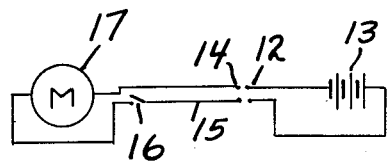
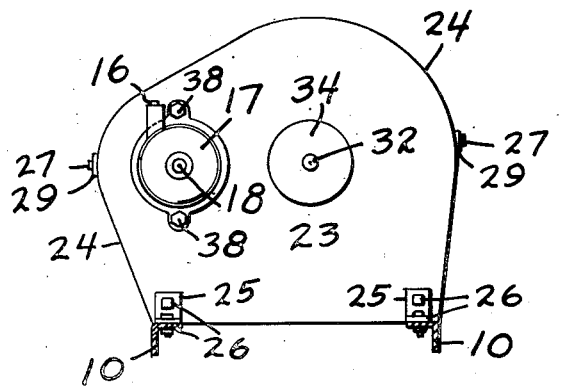
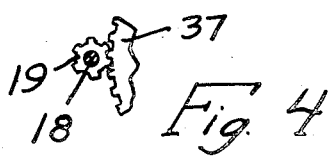
INVENTORS
Robert Dethmers
BY Tenis Engelsman
Sam J. Slotsky
ATTORNEY

United States Patent Office 2,786,358
Patented Mar. 26, 1957

2,786,358

STARTING UNIT FOR FARM MACHINE MOTORS

Robert Dethmers and Tenis Engelsman, Boyden, Iowa

Application July 24, 1953, Serial No. 370,144

1 Claim. (Cl. 74—6)

Our invention pertains to a starting unit for farm machine motors.

An object of our invention is to provide a starting unit which can be firmly attached to a farm machine or other machine having a motor, and so that the motor, which is usually of the internal combustion type, can be started by the unit without the necessity of starting the motor by hand.

A further object of our invention is to provide a framework for the unit which includes all of the necessary parts in an assembled relation, and to provide a hand operated arrangement for engaging the unit with the motor to be started.

A further object of our invention is to provide means wherein the starting unit can be readily connected to the electrical power source of another vehicle, such as a tractor.

With these and other objects in view, our invention consists in the construction, arrangement, and combination of the various parts of our device, whereby the objects contemplated are attained, as hereinafter more fully set forth, pointed out in our claim, and illustrated in the accompanying drawings, in which:

Figure 1 is a plan view of the unit with a fragmentary section thereof,

Figure 2 is a sectional view of Figure 1 taken along the lines 2—2 thereof,

Figure 3 is a schematic view of the electrical circuit, and

Figure 4 is a detail taken in section along the lines 4—4 of Figure 1.

For starting the motors of combines or other equipment, it is usually always necessary for the operator to crank or turn the motor by hand, which is quite objectionable in many cases as the motor is difficult to start. The primary object of our invention is to provide a complete compact unit which can be rigidly secured to the combine or other machine, and is always in place ready to start the combine motor by merely inserting a contact plug into the circuit provided by a standby tractor, etc.

We have used the character 10 to designate a pair of braces or forwardly extending members which are a part of, and attached to a combine structure, it being understood of course that our unit can be also attached to other members, and we have further used the character 11 to indicate the rear portion of a tractor, to which is attached an electrical socket 12 suitably connected to the battery 13 of the tractor.

We have further used the character 14 to indicate a twin plug which is attached to the twin lead 15, it being understood also that a grounded circuit can be used.

The lead 15 is connected to a switch 16 which is attached to an electric motor 17 which drives the shaft 18, to which shaft 18 is attached the small pinion gear 19, the shaft 18 being suitably journalled at 20 within the bracket 21.

The bracket 21 is attached at 22 to the vertical wall 23 of a casing having the perimetral flange 24 enclosing the same, the wall 23 being substantially of the shape as shown in Figure 2, and attached to the wall 23 we provide the right-angled ears or lugs 25 which can be attached to the members 10 by means of the bolts 26.

Also attached at 27 and 28 to the casing flanges 24 and the members 10 respectively, are a pair of straps 29, it thereby being noted that these straps further additionally secure the casing in conjunction with the members 25 to the combine portions.

Journalled at 30 within the portion 31 which extends from the wall 23 is a lengthened shaft 32 to which is secured the transverse pin 33 at one end thereof, the shaft being secured at its other end to the hand operated wheel member 34, and positioned between the member 34 and the casing wall 23 is the compression spring 35, which receives the shaft 32.

Rigidly secured at 36 to the shaft 32 is the large ring gear 37 which in normal position is slightly spaced from the pinion gear 19. Bolts 38 can be used to secure the motor 17 to the casing wall.

The unit above described is thus attached in a fixed manner to the framework of the unit having the motor to be started, and the character 39 indicates the extending end of the crank shaft of the motor to be started, the end 39 having the curved slots 40, the unit being mounted so that the pin 33 lies adjacently to the end 39 as shown. When it is desired to start the motor attached to the member 39, the hand wheel 34 is first thrust in the direction of the arrow 41 and rotated slightly until the pin 33 engages the slots 40, thereby also bringing the gear 37 into engagement with the pinion gear 19. The switch 16 is then closed, and the motor 17 will start, thereby also rotating the gear 37 and shaft 32 and starting the motor of the combine or other machine. As soon as the motor is started, the spring 35 will carry the unit back to normal position.

It will be thus noted that our invention has the desirable effect of providing a unit which is always in place for starting the motor of any type of vehicle or other unit, and it will also be noted that we have provided all of the advantages mentioned in the objects of our invention.

Some changes may be made in the construction and arrangement of the parts of our invention without departing from the real spirit and purpose of our invention, and it is our intention to cover by our claim any modified forms of structure or use of mechanical equivalents which may be reasonably included within its scope.

We claim as our invention:

A starting unit for farm machine motors comprising a framework support member, an electric motor attached to said support member, means for operating said electric motor, gear members driven by said electric motor, one of said gear members including a starting shaft attached thereto, means for engaging said starting shaft with a machine motor for starting said machine motor, means for attaching said support member to framework portions of the machine on which said machine motor is mounted, a hand operated wheel attached to said starting shaft, a spring receiving said shaft and interposed between said wheel and said support member for providing means for resiliently engaging said shaft with the crank shaft end portions of said machine motor, said gear members including a pinion gear driven by said electric motor, a substantially larger ring gear adapted to engage said pinion gear, said ring gear being attached to said starting shaft, said starting shaft being journalled in said support member, a switch member for actuating said electric motor, an electrical lead attached to said switch member, a socket adapted to be connected to the battery circuit of a tractor, means for engaging said lead with said socket, said starting shaft being of substantial length and including a transverse pin at the extremity thereof to provide means whereby said support member will be in fixed position and ready to be engaged with said machine motor when desired.

References Cited in the file of this patent
UNITED STATES PATENTS

| | | |
|---|---|---|
| 1,106,449 | Hulett | Aug. 11, 1916 |
| 2,623,393 | Morrison | Dec. 30, 1952 |
| 2,638,002 | Tenbrink | May 12, 1953 |